March 15, 1932.  K. ANBERG  1,849,132
CORN PICKER
Filed April 27, 1929   3 Sheets-Sheet 1
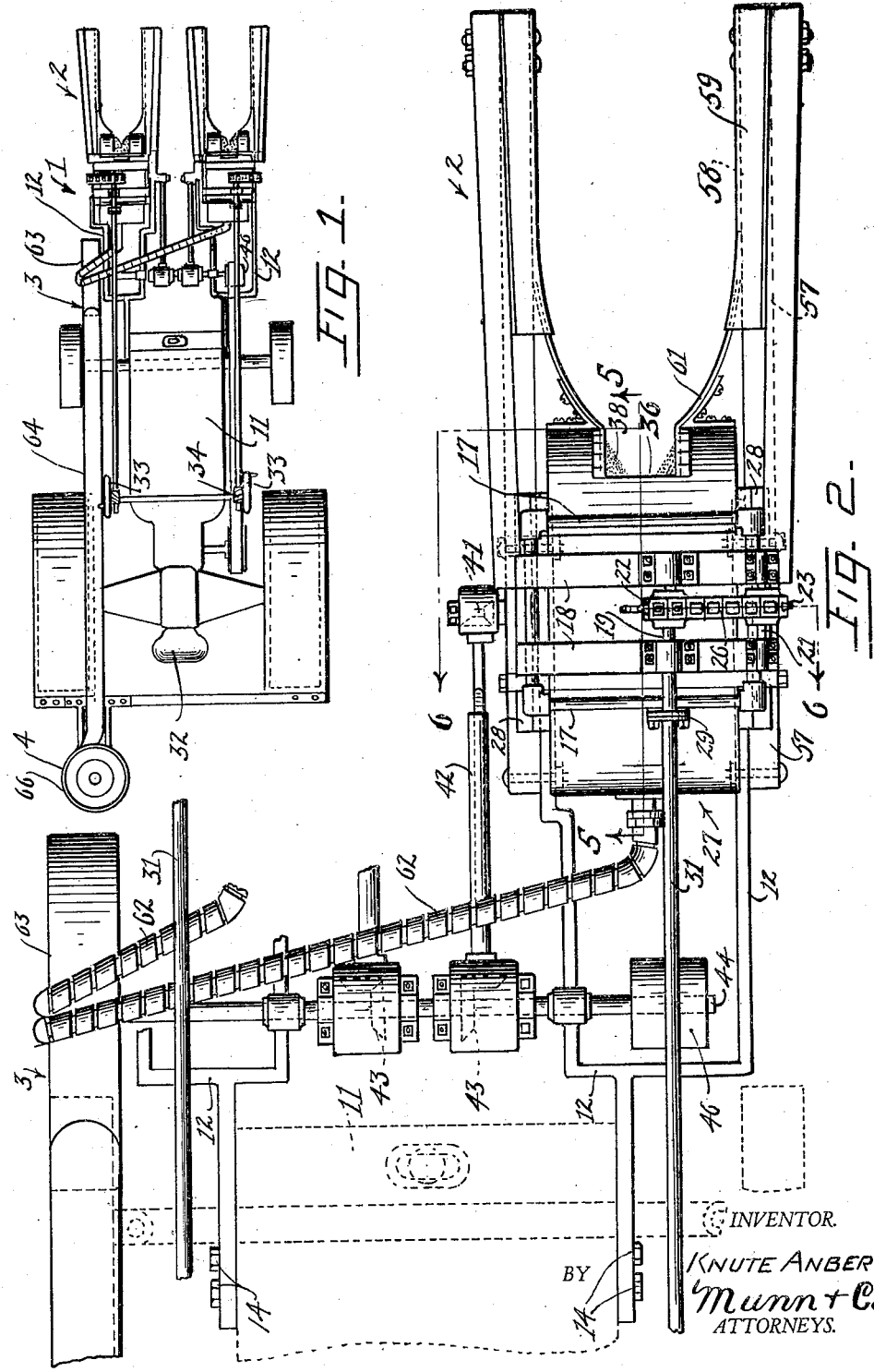
INVENTOR.
KNUTE ANBERG
BY Munn + Co.
ATTORNEYS.

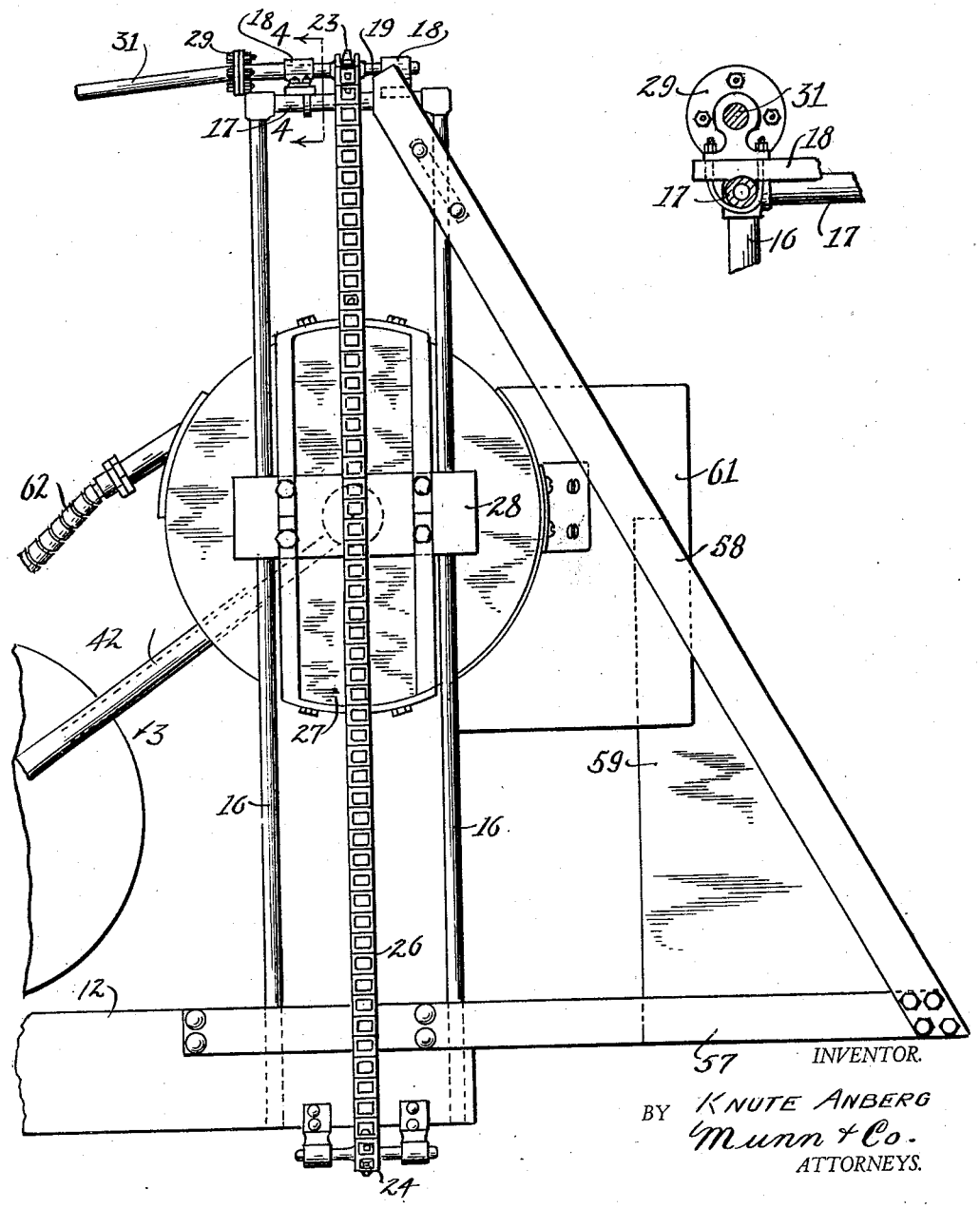

March 15, 1932.  K. ANBERG  1,849,132
CORN PICKER
Filed April 27, 1929  3 Sheets-Sheet 3

INVENTOR.
KNUTE ANBERG.
BY Munn & Co.
ATTORNEYS.

UNITED STATES PATENT OFFICE

KNUTE ANBERG, OF OAKLAND, CALIFORNIA

CORN PICKER

Application filed April 27, 1929. Serial No. 358,593.

The present invention relates to improvements in means for picking corn and more particularly means for picking that type of corn known as Egyptian corn, which distinguishes from Indian corn by the fact that the seeds are much smaller and are held in a head resembling somewhat a bunch of grapes.

The principal object of my invention is to provide a machine that may be carried by a tractor, or other suitable means of locomotion, and guided over a row of standing corn and that will grip one head after the other and strip the same of its seeds.

A further object of the invention is to provide means whereby the seeds may be conveniently collected for discharge into bags or other receptacles.

Another object of the present invention is to provide means in connection with the means hereinabove set forth for cleaning the seed of chaff before it is fed into permanent receptacles.

It is further proposed, in the present invention, to arrange the corn-stripping means in such a manner that two rows may be handled at one time. It is further proposed to arrange the means so that it may be raised or lowered conveniently to suit particular conditions.

Further objects and advantages of my invention will appear as the specification proceeds.

Figure 5:
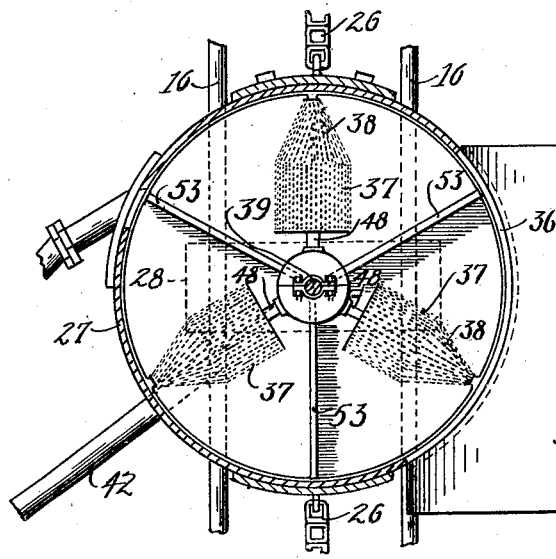
Figure 6:
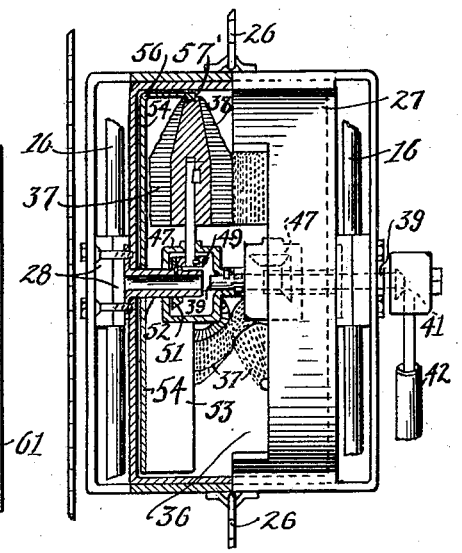
Figure 7:
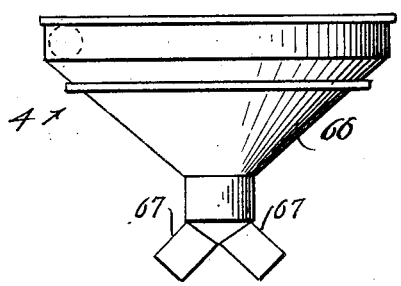
Figure 8:
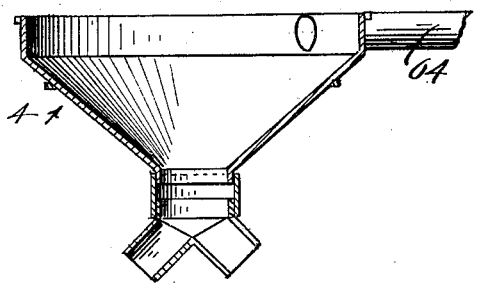

The preferred form of my invention is illustrated in the accompanying drawings, in which Figure 1 shows a top plan view of the entire arrangement, including a tractor and my corn-picking attachment;

Figure 2, an enlarged detail view in plan of the corn picker;

Figure 3, a side elevation of the corn picker;

Figure 4, a detail view taken along line 4—4 of Figure 3;

Figure 5, a sectional view of the corn-stripping means as seen from line 5—5 of Figure 2;

Figure 6, a sectional view of the corn stripper taken along line 6—6 of Figure 2;

Figure 7, a side elevation of a hopper made for separating the shaff from the corn seeds and for feeding into bags; and Figure 8, a vertical section through the hopper shown in Figure 7.

While I have shown only the preferred form of my invention, I wish to have it understood that various changes or modifications may be made within the scope of the claims hereto attached without departing from the spirit of the invention.

In its general features, my invention comprises a corn-stripping means 1, a guide means 2 for guiding the heads of Egyptian corn toward the stripping means, suction means indicated at 3 for drawing the corn seeds and chaff from the stripping means and delivering the same into the hopper 4 where the seed is cleaned and delivered to sacks which may be attached to the bottom of the hopper.

The device, as shown in the drawings, is made to cover two rows of corn, and two corn-stripping means are therefore shown, which are identical in construction.

The tractor 11, which may be of any suitable construction, has two brackets 12 extending forwardly therefrom, the brackets being preferably secured to the tractor frame by means of bolts 14 or otherwise.

The forward end of each bracket is forked and supports four uprights 16, which are joined at their upper ends by means of a rectangular frame 17. This frame supports two cross pieces 18, forming bearings for two longitudinal shafts 19 and 21, one being mounted substantially over the center of the fork, while the other is mounted over the edge. Each of the two shafts 19 and 21 carries a sprocket 22 and 23 respectively. Underneath the forked end of the bracket and in vertical alignment with the two sprocket wheels 22 and 23, there are two other sprocket wheels 24, and a chain 26 is guided over the four sprocket wheels, the ends of the chain being fastened to the drum 27 arranged between the four uprights 16 and guided by the latter by means of perforated guide blocks 28 riding on the uprights respectively. The upper shaft 19 is connected through a universal joint 29 with the shaft 31, which may be operated from the driver's seat, indicated at 32, by means of a hand wheel 33 and a worm drive, indicated at 34. By means of the construction thus far described, the operator driving the tractor may raise or lower the drum 27 which constitutes the main part of my mechanism.

The drum 27 is mounted transversely to the direction of travel and is formed with a large opening 36 in its front section into which the corn is guided as the drum rides over a row of standing corn. Within the drum, there are mounted three pairs of brushes 37, the two brushes of each pair being made to revolve in opposite directions. The front ends of the brushes are tapered, as shown at 38, so that when a head of corn is guided between the two brushes of a pair, the brushes will grip the head from opposite sides and will strip the same of the seeds, throwing the seeds outward against the end faces of the drum.

The structural features of this arrangement may be varied in many ways and are shown in the drawings as comprising a shaft 39 extending into the drum from one side, the shaft receiving rotary motion through bevel gears 41, an extensible shaft 42, a second set of bevel gears 43 and a transverse main drive shaft 44, having the pulley 46 fixed thereto, which pulley receives rotary motion from the tractor mechanism through any suitable means. The shaft 39 extends into the drum somewhat beyond the center line and has two small cages 47 fixed thereto. Each of the cages has three radial spokes 48 journaled in its wall, and each of these spokes carries a brush 37 and is revolved by means of a bevel gear 49 fixed to the spoke and meshing with a stationary bevel gear 51 fixed to a stationary sleeve 52 extending into the drum in concentric relation with the shaft 39. Each cage has also fixed thereto three blades 53 extending in a direction diametrically opposite each spoke 48, and projecting from a disc 54 which latter has arms 56 extending therefrom for supporting the extension points of the brushes 38 as shown at 57'.

It will be seen from this description that when the pulley 46 is rotated, this rotary motion is transmitted through the bevel gears, indicated at 43 and 41, to the shaft 39, which latter causes the cages 47 and with them the brushes and the blades to revolve within the drum. While the brushes 37 revolve about the axis of the drum, they are also made to revolve, in opposite directions, on their own axes, due to the engagement of the bevel gears 49 with the stationary bevel gears 51.

Suitable guide means extend forwardly from the drum, so that all the corn heads within a row will be guided into engagement with the brushes.

The guide means comprise bars 57 extending forwardly from the forked end of each bracket 12 so as to straddle a row of corn and braces 58 connecting the forward end of each bar 57 with the upper ends of the uprights 16, with suitable guide plates 59 and 61 supported on the braces and the drum respectively.

Each of the drums is connected through a flexible pipe 62 with a blower 63, which creates suction in the drum and draws the seeds and the chaff from the drum, to deliver the same through a pipe 64 into the hopper 66, preferably mounted at the rear end of the tractor. This hopper is cylindrical in its upper section and the seed and chaff are delivered into the same in a tangential direction, so as to whirl in the hopper before settling, whereby the chaff is separated from the heavier seeds and blown away over the edge of the hopper, while the seed is discharged through either one of the spouts 67 into a bag suspended therefrom.

The operation of the device will be readily understood from the foregoing description.

The operator of the tractor drives the same so that each pair of guides 2 straddles a row of corn. He then, by operation of his hand wheel 33, raises or lowers his drum 27 in accordance with the height of the corn to be picked. After having made this adjustment, he advances the tractor, and the heads of the corn are successively guided between the brushes which, revolving in opposite directions on their own axes and also revolving on the axis of the drum, ride upwardly on the stem of the corn, dragging the upper end forwardly until they reach the head, whereupon they strip the head of the seeds, throwing the seeds against the two end walls of the drum to be caught by the blades 53, from which the seeds and whatever chaff has been separated with the same are drawn by suction into the flexible pipe 62 and finally delivered into the hopper 66, where the whirling motion causes the chaff to be thrown over the edge of the hopper while the seed is discharged into a sack secured to one of the spouts 67. Two spouts are provided to allow operation to continue while the sacks are changed.

It will be noted that the pairs of brushes 37 swing about the axis of the drum in a counter-clockwise direction so that each pair of brushes will have a vertical wiping effect on the head of corn. The outer ends of the brushes are conical-shaped and form a wedge for receiving the head of corn. The brushes of each pair rotate in opposite directions and not only remove the seeds from the corn, but also throw the seeds against both sides of the housing where they will drop upon the vanes 53 and subsequently be carried to the suction pipe where they will be sucked in and conveyed to the hopper 66.

I claim:

1. A picker for Egyptian corn and the like comprising a cylindrical housing having a rotary element therein and having a slot in the circumference thereof, means for advancing the housing over a row of corn, means for guiding the corn toward the slot and means including sets of brushes, each set having two rotating brushes associated with the rotary element for stripping the head of the corn.

2. A picker for Egyptian corn and the like comprising a cylindrical housing having a rotary element therein and having a slot in the circumference thereof, means for advancing the housing over a row of corn, means for guiding the corn toward the slot, means associated with the rotary element for stripping the head of corn, the said last-named means comprising two co-acting brushes disposed to become operative on the corn head from opposite sides, and means for rotating the brushes in opposite directions.

3. In a picker, a housing having an entrance opening for the heads of Egyptian corn, a rotatable shaft, radially extending vanes carried by said shaft and being movable past both sides of the entrance opening, radially extending rotatable brushes being revolvable about the shaft, said brushes being grouped in pairs, means for rotating the brushes of each pair in opposite directions, and a suction hose communicating with the housing.

4. In a picker, a housing having an entrance opening for the heads of Egyptian corn and the like, a rotatable shaft, radially extending rotatable brushes revolvably carried by said shaft, said brushes being grouped in pairs, and means for rotating the brushes of each pair in opposite directions, the brushes of each pair contacting with each other and having conical end portions.

KNUTE ANBERG.